Jan. 19, 1960 G. V. CONSTANTAKIS 2,921,627

TIRE TREAD CUTTING APPARATUS

Filed June 22, 1955 4 Sheets-Sheet 1

INVENTOR.
GEORGE V. CONSTANTAKIS
BY
Irwin M. Lewis
ATTORNEY.

TIRE TREAD CUTTING APPARATUS
Filed June 22, 1955
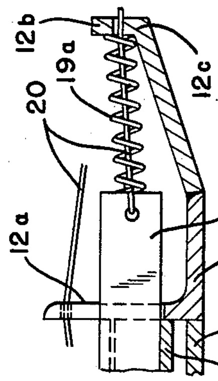
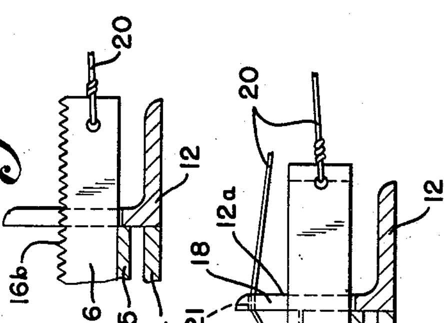
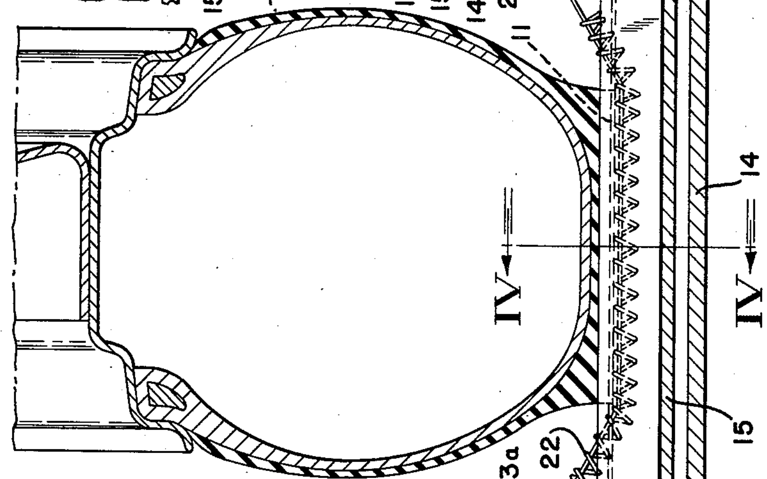
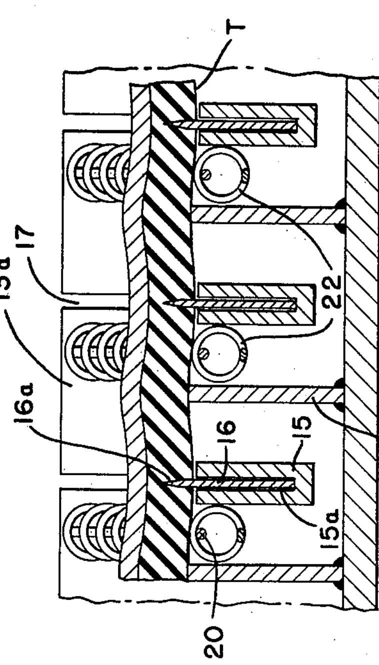
INVENTOR.
GEORGE V. CONSTANTAKIS
BY
Irwin M. Lewis
ATTORNEY.

TIRE TREAD CUTTING APPARATUS
Filed June 22, 1955 4 Sheets-Sheet 3
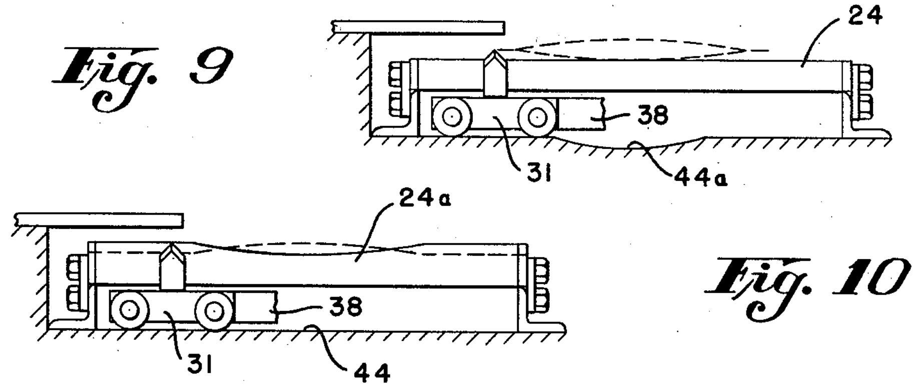
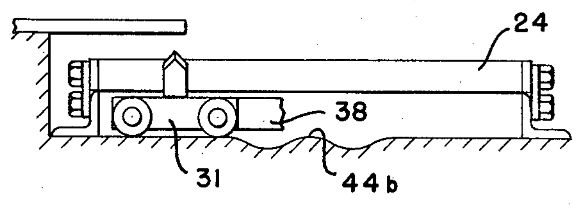
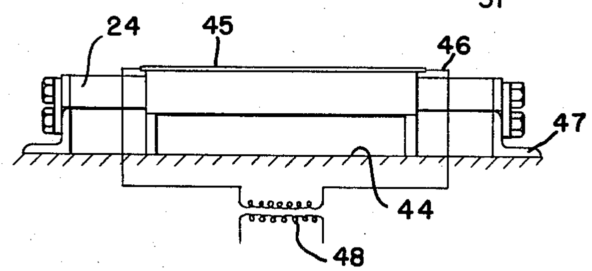
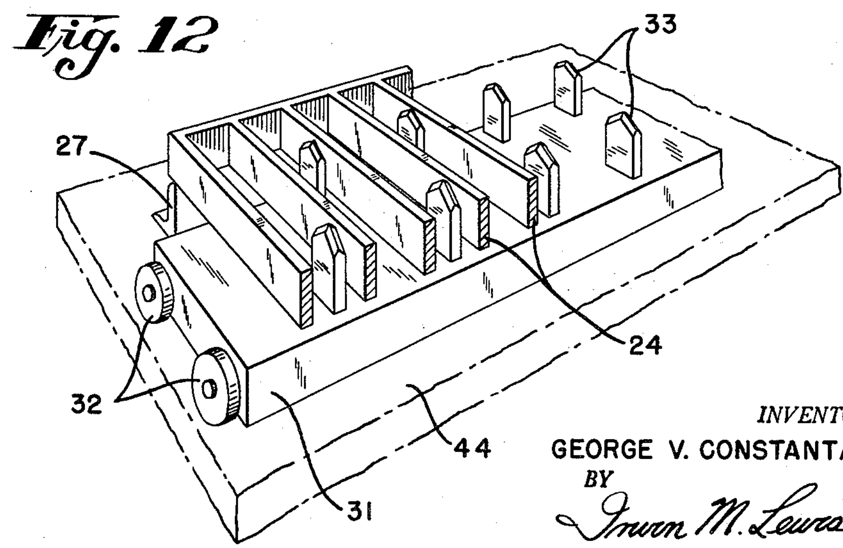
INVENTOR.
GEORGE V. CONSTANTAKIS
BY
Irwin M. Lewis
ATTORNEY.

TIRE TREAD CUTTING APPARATUS
Filed June 22, 1955 4 Sheets-Sheet 4
Fig. 5
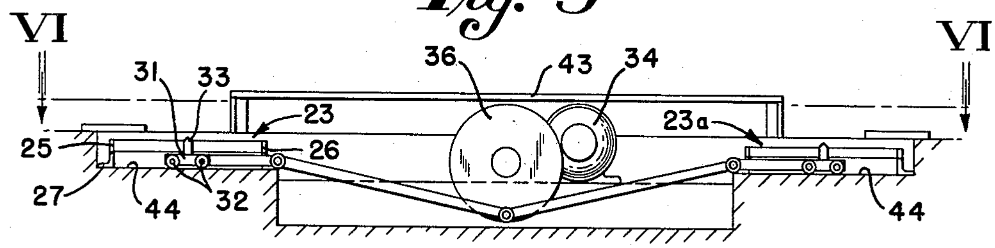
Fig. 6
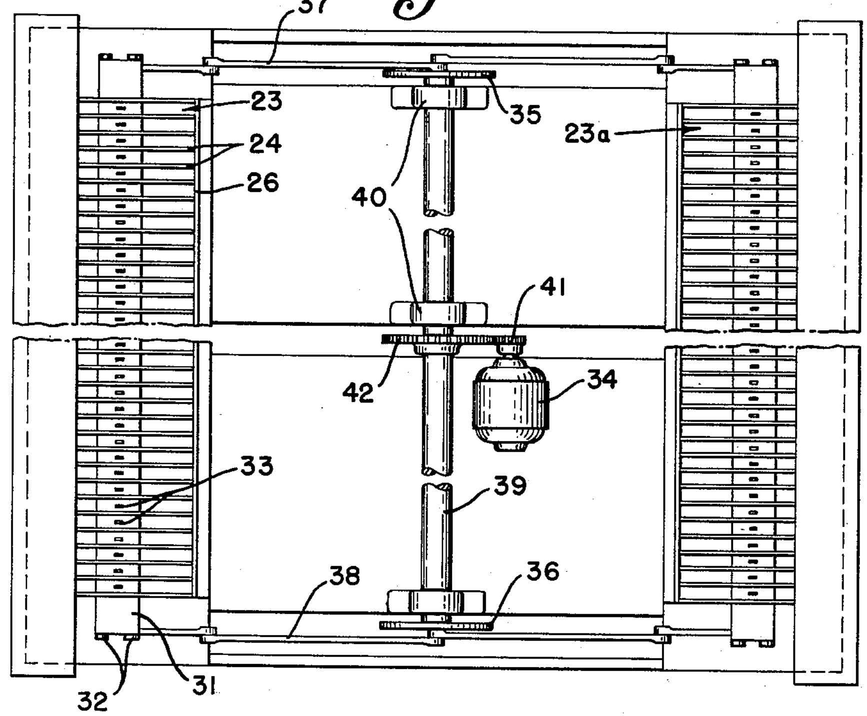
Fig. 7
Fig. 8
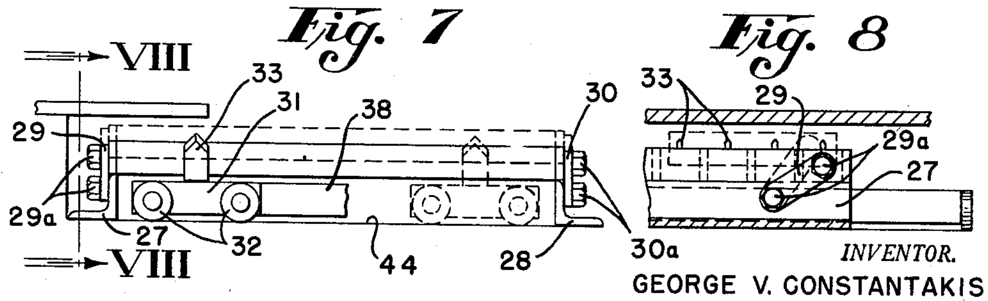
INVENTOR.
GEORGE V. CONSTANTAKIS
BY Irwin M. Lewis
ATTORNEY.

2,921,627

TIRE TREAD CUTTING APPARATUS

George V. Constantakis, Allen Park, Mich., assignor to United States Rubber Company, New York, N.Y., a corporation of New Jersey Application June 22, 1955, Serial No. 517,119

8 Claims. (Cl. 157—13)

This invention relates to apparatus for forming slits or slots in the rubber treads of vehicle tires to increase the traction properties thereof.

The primary object of the invention is to provide apparatus by which the treads of vehicle tires, while mounted on the vehicle, may be slitted or slotted to increase the traction thereof merely by rolling, drawing or driving the vehicle, preferably, but not necessarily, under its own power along the apparatus. The advantage of the apparatus is that it is not necessary to remove the tires or jack up the wheels on which the tires are mounted to slit or slot the treads thereof, as is necessary in using apparatus heretofore proposed. A further advantage of the apparatus is that all tires of the vehicle may be slitted or slotted simultaneously.

To accomplish these objects and advantages, the apparatus of the invention includes a track or frame formed of spaced tire supporting elements along which the tires of a vehicle may roll while mounted on the vehicle. Mounted in the spaces between the time supporting elements are cutting means for forming slots or slits in the treads of the tires as they are rolled therealong.

In one form of the invention, the cutting means includes cutting knives reciprocated by the weight of the vehicle as the vehicle is moved along the frame or track.

In another form of the invention the cutting means includes cutting knives reciprocated by a separate power source.

In still another form of the invention the cutting means includes a stationary heated knife or wire engageable with the treads of the tire as the vehicle is moved along the frame or track so that slits or slots are burned or seared in the treads.

Other objects of the invention will become apparent from the following description, when read in conjunction with the accompanying drawings wherein:

Fig. 3 is an enlarged sectional view through one-half of the apparatus as shown in Fig. 1, illustrating the engagement of the tread of a tire therewith in the slitting or slotting thereof;

Fig. 3A is a partial sectional view, similar to that of Fig. 3, but showing a modification of the apparatus;

Fig. 3B is a partial sectional view, similar to that of Fig. 3, but showing a modified form of cutting knife;

Fig. 4 is a sectional view taken on the line IV—IV of Fig. 3 showing the relative positions of the cutting knives and the track or frame and further illustrating the engagement of the tread of the tire therewith in the slitting or slotting of the tread;

Fig. 4A is a partial sectional view, similar to that of Fig. 4, showing the use of shims and caps to vary the relative height between the cutting knives and the frame or track;

Fig. 5 is an elevational view of a modified form of the invention in which the cutting knives are reciprocated by a seperate power source;

Fig. 6 is a sectional view of the apparatus of Fig. 5 taken on the line VI—VI of Fig. 5;

Fig. 7 is a partial elevational view of the apparatus of Fig. 5, showing by dash lines the extent of movement of the cutting knives and vertical adjustments of the tracks or frames relative to the cutting knives;

Fig. 8 is a partial sectional view of the apparatus of Fig. 5 showing the linkage providing for vertical adjustment of the tracks or frames relative to the cutting knives;

Figs. 9, 10 and 11, are sectional views similar to that of Fig. 7, showing modifications of the apparatus providing for variations in the depth of cut made by the cutting knives;

Fig. 12 is a partial perspective view of the apparatus of Fig. 5 showing a different arrangement of the cutting knives to provide a variation in the pattern of slits or slots formed in the tread, and Fig. 13 is a sectional view similar to that of Fig. 7, but showing the use of an electrically heated cutting element in place of the reciprocally mounted cutting knives of the apparatus as shown in Fig. 5.

Figure 1:
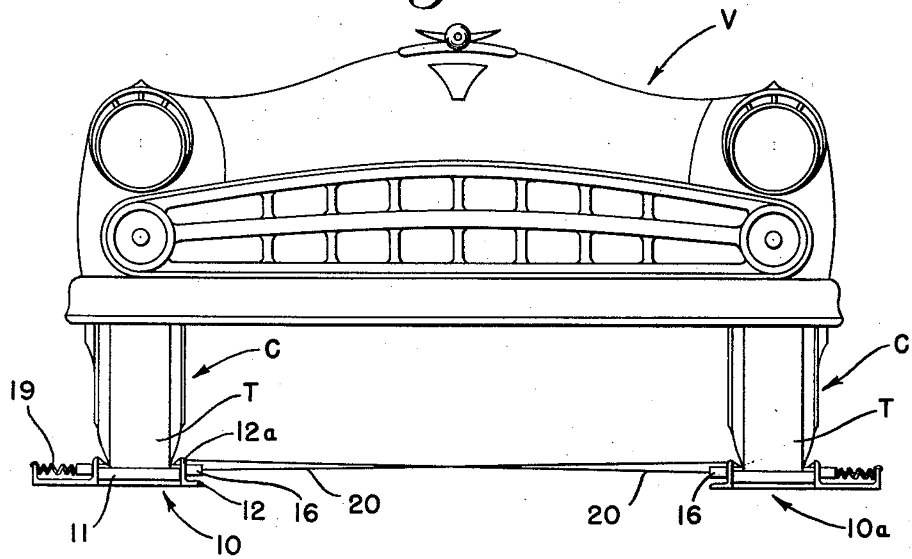
Fig. 1 is an elevational view of one form of the apparatus of the invention showing a vehicle being driven therealong to slit or slot the treads of the tires thereof.
Figure 2:
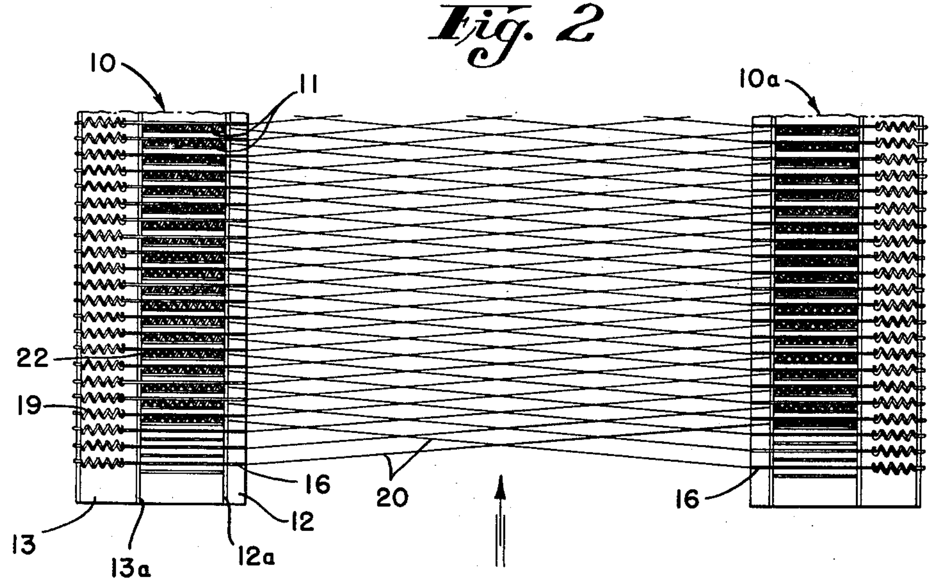
Fig. 2 is a partial plan view of the apparatus of Fig. 1; the particular form of the apparatus illustrated being that in which the weight of the vehicle is utilized to actuate or reciprocate cutting knives.

Referring to the drawings and in particular to Figs. 1, 2 and 3, the apparatus includes two spaced, parallel tracks or frames, generally designated by the reference numerals 10 and 10*a*, along which the tires C of a vehicle V may roll as the vehicle is driven or otherwise moved therealong.

The tracks or frames, 10 and 10*a*, are essentially identical and are formed of a plurality of spaced tire supporting elements 11, which in the embodiment illustrated are in the form of metal bars secured at one end to the vertical leg 12*a* of an elongated angle member 12 and secured at the other end to a vertical leg 13*a* of a channel member 13 to thereby form an elongated grating. The angle member 12 and the channel member 13 are secured to opposite edges of a base plate 14.

In each of the spaces between adjacent bars 11, there is mounted a knife guide 15 having a slot 15*a* therein in which an elongated cutting knife 16 is slidably received for reciprocatory movement parallel to the upper surface of the grating bars 11. The edge of knife 16 may be either straight as shown at 16*a* in Figs. 3 and 3A, or serrated as shown at 16*b* in Fig. 3B. The knife guides 15 are secured at one to the leg 12*a* of the angle member 12 and at the other end to the leg 13*a* of the channel member 13. The cutting knives 16 extend at each end through slots 17 and 18 provided respectively in the leg 13*a* of the channel member 13 and the leg 12*a* of the angle member 12. In the embodiment shown in Fig. 3, each cutting knife 16 has an extension spring 19 associated therewith which is attached at one end to one end of the cutting knife 16 and at the other end to a vertical leg 13*b* of the channel member 13. The springs 19 serve, as will hereinafter be described in detail, as part of the mechanism for reciprocating the cutting knives 16. In the modification shown in Fig. 3A, the extension spring 19 is eliminated, and a compression spring 19*a* interposed between the other end of the cutting knife 16 and a leg 12*c* of an angle member 12*b* serves the same function as the extension spring 19.

As best shown in Fig. 2, each cutting knife 16 has a cable or wire 20 attached to the end thereof. The cables or wires 20 attached to the cutting knives 16 of one track or frame extend over to the other parallel track or frame, pass through openings 21 (Fig. 3) provided in the leg 12*a* of the angle member 12 adjacent the upper edge thereof, extend across and above the bars 11 and are secured to the leg 13a of the channel member 13 of the other track or frame. As the tires C of the vehicle V are rolled along the tracks or frames 10 and 10a, the cables 20 are depressed by the treads T of the tires causing the cutting knives 16 to move inwardly against the force of the springs 19 or 19a. The tires mounted on one side of the vehicle cause movement of the cutting knives 16 for slitting the tires mounted on the other side of the vehicle. When the cables 20 are released by the treads T of the tires C as the vehicle rolls along the track or frames 10 and 10a, the springs 19 or 19a return the cutting knives 16 to their original position. Coil springs 22 positioned around the end portions of the cables 20 prevent the cables from dragging on or cutting into the tire treads T. The springs 22 and the cable 20 are so positioned that they can be pressed into the spaces between the bars 11 and the knife guides 15. The pressure of the treads T of the tires C on the cutting edges 16a of the knives 16 couple with the reciprocation of the cutting knives 16 to slit the treads T of the tires C as the vehicle V is driven along the tracks or frames 10 and 10a. For ease of motion, it is desirable that the pressure of the treads T on cutting edges 16a be the minimum necessary to slit the tread. To achieve this minimum, a portion of tire pressure is transferred to bars 11. The height of the bars 11 relative to the knife edges 16a, is adjustable to achieve the desired pressure on the edges 16a by the provisions of shims 15b (Fig. 4A) interposed between the knifes and the bottoms of the slots 15a in the knife guides 15 and/or by caps 11a adapted to be slipped over the top of the bars 11.

As best shown in Fig. 2, the cables 20 which actuate the cutting knives 16 of one track or frame are connected to the other track or frame at points spaced longitudinally of the cutting knives 16 which they operate. This insures that the tread of the tire will be in contact with the cutting edge 16a of the cutting knives 16 when the tread of the tire on the opposite side of the vehicle starts to depress the operating cables 20 thereof as the vehicle is driven along the tracks or frames 10 and 10a, in the direction of the arrow in Fig. 2.

In using the apparatus to slit the treads of tires mounted on a vehicle, the vehicle need merely be driven or otherwise moved along the tracks or frames 10 and 10a in the direction of the arrow in Fig. 2 and the treads of the tires will automatically be slitted or slotted at relatively closely spaced intervals. Preferably, the tracks or frames 10 and 10a are of a length that the treads will be slitted or slotted at spaced intervals around the full circumference of the tire on only one passage of the vehicle along the tracks or frames 10 and 10a. However, the tracks or frames 10 and 10a can be shorter, in which case two or more passes of the vehicle therealong must be made in order to slit or slot the tread of the tire around the full circumference thereof.

The tracks or frames, 10 and 10a, serve, not only to support the tires, but also, because of the structure thereof, to reduce the compression in the portion of the tread being slit, thereby making it easier for the cutting knives 16 to cut therethrough. This reduction in compression results from the tread sagging into the spaces between the bars 11 as shown in Fig. 4.

The apparatus as above described, because it requires no separate power source for reciprocating the cutting knives, may be readily transported and is, therefore, particularly useful for temporary installations. The apparatus, however, is also suited for permanent installation in vehicle servicing stations, such as wash racks, where the presence of water aids the slitting process. In such installations, a cover may be provided to prevent contact of the vehicle tires with the cutting knives when the slitting or slotting process is not being performed. In Figs. 5 and 6, there is shown a modified form of the invention in which the cutting knives are reciprocated by a separate power source. This modified form is especially suited for permanent installations such as garages or the like.

Like the form of the invention shown in Figs. 1 and 2, this modified form of the invention also includes parallel, spaced tracks, runways or frames 23 and 23a along which a vehicle may be drawn or driven. The tracks or frames are formed of spaced parallel bars 24 secured at each end to end plates 25 and 26. The tracks or frames are adjustably secured to the vertical legs of longitudinally extending angle members 27 and 28 by links 29 and 30, as shown in Figs. 7 and 8, so that the tracks or frames may be adjusted in a vertical direction.

The tracks or frames 23 and 23a are preferably mounted in recesses in the floor so that they will be substantially flush with the floor level, thereby facilitating the driving of the vehicle therealong.

Below each track or frame there is provided a carriage 31 mounted on rollers 32 for transverse movement on a flat surface 44 parallel to the upper surface of the bars 24. While the roller mounting of the carriage 31 is preferred, it will be appreciated that the carriage could be slidably mounted directly on the surface 44. Secured to the carriages 31 and extending up through the spaces between the bars 24 are a plurality of cutting knives 33.

The carriages 31 and the cutting knives 33 secured thereto are reciprocated by means of a motor 34 through cranks 35 and 36 which are connected by connecting rods 37 and 38 to opposite ends of the carriages. Cranks 35 and 36 are secured to opposite ends of a shaft 39, which in turn is rotatably supported in spaced bearings 40 and driven from motor 34 by means of a pinion 41 secured to the motor shaft and a gear 42 secured to the shaft 39.

The motor 34, shaft 39 and cranks 35 and 36 are preferably mounted in a pit in the floor and enclosed by a cover 43.

The tracks or frames 23 and 23a may be adjusted vertically merely by loosening the securing bolt 29a and 30a of the links 29 and 30, raising the gratings to the desired extent, and re-tightening the bolts 29a and 30a. Full adjustment of the gratings to the extent indicated in Figs. 7 and 8 permits use of the tracks or frames as guards to prevent injury from the cutting knives 33 when the apparatus is not in use. Covers for the tracks or frames may also be provided to prevent injury, if desired. Intermediate adjustment of the tracks or frames may also be made to vary the extent the cutting knives extend above the surface of the tracks or frames to thereby vary the depth of cut made.

In using the apparatus of Fig. 5 to slit the treads of tires mounted on a vehicle, the vehicle is merely driven along the tracks or frames 23 and 23a and the cutting knives 33 reciprocated by operation of the motor 34 simultaneously therewith.

As shown in Figs. 9 and 10, the depth of cut made by the knives 33 may be varied across the tread of the tire by varying the contour of the surfaces 44 on which the carriages 31 are moved. In the modification of Fig. 9, the surface 44 is provided with a concave portion 44a. As a result thereof, the knives 33 cut the tread deep at the shoulders thereof and shallow, or not at all, at the center. The lower dashed line in Fig. 9 represents the path of movement of the cutting edge of the knives 33 when the concave portion 44a is provided. The upper dashed line in Fig. 9 represents the path of movement the cutting edges of the knives 33 would follow if a convexed portion (not shown) were provided instead of the concave portion 44a.

In the modification of Fig. 11, two concave portions 44b are provided in the surface 44 with the result that the knives 33 make a multiple of short cuts across the tread. Other variations in the contour of the surface 44 can be provided to give other variations in the depth of slits or slots formed or a variation in the pattern or arrangement of the slits or slots formed.

As shown in Fig. 10, a similar variation of the depth of cut may be provided by varying the contour of the tire supporting bars 24. In the modification shown, the bars 24 are provided with concave portions **24*a*** with the result that the tread is cut deeper at the center thereof than at the shoulders. The dash line in Fig. 10 represents an alternate contour resulting in the tread being cut deeper at the shoulders than at the center.

In the modification of Fig. 12, the knives 33 are staggered relative to each other with the result that each cutting knife 33 cuts only part way across the tread. The modifications of Figs. 9, 10, 11 and 12 may be used either singularly or in combination to give a variety of patterns.

In Fig. 13, there is shown a further modification in which the carried knives 33 are replaced by a stationary blade 45 to the top edge of which is attached an electrically heated wire 46. The blades are secured to longitudinally extending supports 47, which in turn are supported on the surface 44. The blades 45 extend up through the spaces between the bars 24 of the tracks 23. The tires roll along the tracks in 23, slots are seared or burned into the treads thereof by the heated wire 46 forming the edge of the blades 45. Electricity for heating the wires 46 is applied through a transformer 48 from a source of electrical energy (not shown).

While certain preferred embodiments of the invention have been shown and described, it is to be understood that this is for the purpose of illustration only and that changes and modifications can be made therein without departing from the spirit and scope of the invention.

Having thus described my invention, what I claim and desire to protect by Letters Patent is:

1. Apparatus for forming cuts in the treads of vehicle tires comprising, a grating along which the tires of a vehicle while mounted on the vehicle may roll, said grating being formed of a plurality of spaced tire supporting elements, cutting knives extending up between said elements for forming cuts in the treads of the tires as the tires are rolled therealong, and means for reciprocating said knives vertically and transversely of said grating.

2. Apparatus for forming cuts in the treads of vehicle tires to increase the traction thereof comprising, a grating along which the tires of a vehicle while mounted on the vehicle may roll, said grating being formed of a plurality of spaced tire supporting elements, a carriage mounted below said grating, cutting knives secured to said carriage and extending up between said elements, and means for reciprocating said carriage to move said knives relative to said grating to thereby form cuts in the treads of the tires as the tires are rolled along said grating.

3. Apparatus for forming cuts in the treads of vehicle tires to increase the traction thereof comprising, a grating along which the tires of a vehicle while mounted on the vehicle may roll, a carriage mounted below said grating on a member having a surface of irregular contour, cutting knives secured to said carriage and extending up between said elements, and means for moving said carriage across said surface whereby vertical and transverse movement is imparted to said cutting knives to form cuts in the treads of the tires as the tires are rolled along said grating.

4. Apparatus for cutting the treads of vehicle tires to increase the traction thereof comprising, a grating along which the tires while mounted on the vehicle may be rolled, said grating being formed of a plurality of spaced tire supporting elements, cutting knives extending up between said elements, and means for reciprocating said cutting knives to form cuts in the treads of the tires as the tires are rolled along said grating.

5. Apparatus for cutting the treads of vehicle tires to increase the traction thereof comprising, a grating along which the tires while mounted on a vehicle may be rolled, said grating having a plurality of openings in the surface thereof, cutting knives mounted in said openings for reciprocatory movement relative to the grating, and means for reciprocating said cutting knives to form cuts in the treads of the tires as they are rolled along said grating.

6. Apparatus for cutting the treads of vehicle tires to increase the traction thereof comprising, a grating formed of a plurality of spaced bars, cutting knives extending up between said bars, means mounting said cutting knives for reciprocatory movement relative to said bars, and means for reciprocating said knives.

7. Apparatus for forming cuts in the treads of vehicle tires to increase the traction thereof comprising, a pair of parallel gratings along which the tires of a vehicle while mounted on the vehicle may be rolled, cutting elements mounted in the openings through said gratings, means mounting said cutting elements for reciprocatory movement relative to said gratings, and means for reciprocating said cutting elements.

8. Apparatus for forming cuts in the treads of vehicle tires to increase the traction thereof comprising, a pair of parallel gratings along which the tires of a vehicle may be rolled, cutting knives extending up through the openings in said gratings, means mounting said cutting knives for reciprocatory movement relative to said gratings, a motor, and means interconnecting said motor and said knives for reciprocating said knives upon operation of the motor.

References Cited in the file of this patent

UNITED STATES PATENTS

| | | |
|---|---|---|
| 1,920,591 | Pesci | Aug. 1, 1933 |
| 1,975,930 | Errig et al. | Oct. 9, 1934 |
| 2,245,728 | Sipe | June 17, 1941 |
| 2,675,075 | Constantakis | Apr. 13, 1954 |